(12) United States Patent
Lin

(10) Patent No.: US 6,402,449 B1
(45) Date of Patent: Jun. 11, 2002

(54) SCREW WITH AN IMPROVED HEAD

(76) Inventor: Frank Lin, No. 621, Hsin Yi Road, Ta Chi Chen, Tao Yuan Hsien (TW)

( * ) Notice: Subject to any disclaimer, the term of this patent is extended or adjusted under 35 U.S.C. 154(b) by 0 days.

(21) Appl. No.: 09/246,156

(22) Filed: Feb. 8, 1999

(51) Int. Cl.⁷ .................. F16B 23/00; F16B 35/06
(52) U.S. Cl. .................. 411/403; 411/404; 411/919
(58) Field of Search .................. 411/403, 404, 411/407, 410, 919

(56) References Cited

U.S. PATENT DOCUMENTS

| | | | | |
|---|---|---|---|---|
| 2,066,484 A | * | 1/1937 | Phillips | 411/404 |
| 2,397,216 A | * | 3/1946 | Stellin | 411/404 |
| 3,584,667 A | * | 6/1971 | Reiland | 411/919 X |
| 3,872,904 A | * | 3/1975 | Barlow | 411/403 X |
| 5,137,407 A | * | 8/1992 | Yamamoto | 411/404 |
| 5,797,659 A | * | 8/1998 | Fuller | 411/410 X |

FOREIGN PATENT DOCUMENTS

| | | | | |
|---|---|---|---|---|
| DE | 2608892 | * | 9/1977 | 411/403 |
| GB | 23421 | * | 6/1911 | 411/403 |
| WO | 2137 | * | 6/1983 | 411/403 |

* cited by examiner

Primary Examiner—Neill Wilson
(74) Attorney, Agent, or Firm—Dougherty & Troxell

(57) ABSTRACT

Disclosed is a screw with an improved head, in which a stress-relieving notch is formed at each corner of a driving recess on the screw head. The stress-relieving notch is in an equal arcuate shape. Apart from the well known slotted or Phillips one, the driving recess is also available with a triangle, square, hexagonal, or any other multiangular form in section.

4 Claims, 4 Drawing Sheets

SCREW WITH AN IMPROVED HEAD

BACKGROUND OF THE INVENTION

The present invention relates to a screw with an improved head, in which a stress-relieving notch is disposed at each corner of a driving recess on the screw head.

As screws can be easily threaded into or removed from a workpiece to facilitate an assembling or disassembling job, they have been widely used nowadays. In particular, the advance of technology has made the screws possible for mass production, resulting in a cutdown in their manufacturing costs, and which is further promoting their use.

A screw generally comprises a head being larger in diameter and a threaded shank axially extending from the head. A driving recess is formed on the head at the center thereof for insertion of a tool to apply driving force. The driving recess can be designed to be different in shape. Apart from the well known cross, triangle, square, hexagonal, or multiangular driving recess is also available. In use, a screw driver with a corresponding cross section is inserted into the driving recess for applying driving force to turn the screw for tightening or removal purpose.

Although the screw of this type can meet its basic function requirements, it has the disadvantage that, upon the screw forge-forming process, material hardening treatment and stress concentration often cause the corners of the driving recess on the screw head to crack as shown in FIG. 1 crack A, thereby weakening the capability of such a driving recess to bear against the stress. On the other hand, the punch used for forge-forming purpose are also likely to get broken or worn out at the edge of the punch where an sharp edge exists. Consequently, it is difficult to obtain a good quality control in the course of mass production. Moreover, due to this disadvantage, only some materials can be selected for forge-forming purpose, it is difficult to use highly hardened materials, such as stainless steel, high carbon steel or aerospace Alloy.

SUMMARY OF THE INVENTION

It is the object of the present invention to provide a screw with an improved head, in which a stress-relieving notch is disposed at each corner of a driving recess on the screw head for distributing the stress in an attempt to prevent cracking as frequently occurred in a conventional screw.

BRIEF DESCRIPTION OF THE DRAWINGS

The foregoing and other features and advantages of the present invention will be more clearly understood from the following detailed description and the accompanying drawings, in which.

DETAILED DESCRIPTION OF PREFERRED EMBODIMENTS

Figure 1:
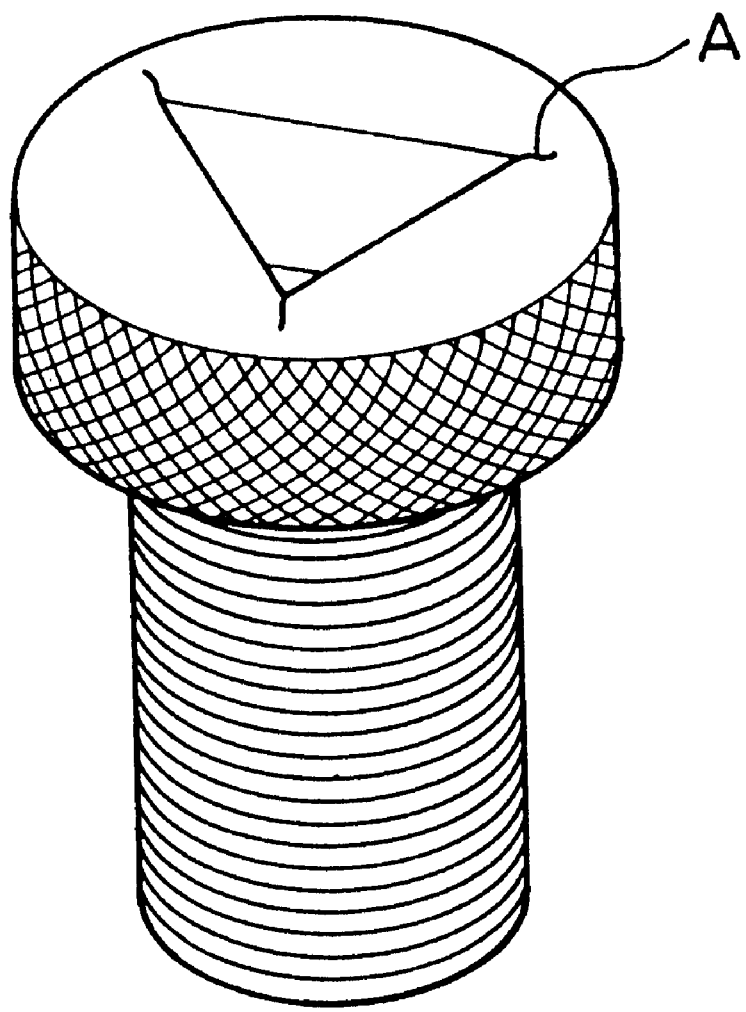
FIG. 1 is a perspective view of a conventional screw, showing there are cracks occurred at each corner of the driving recess.
Figure 4:
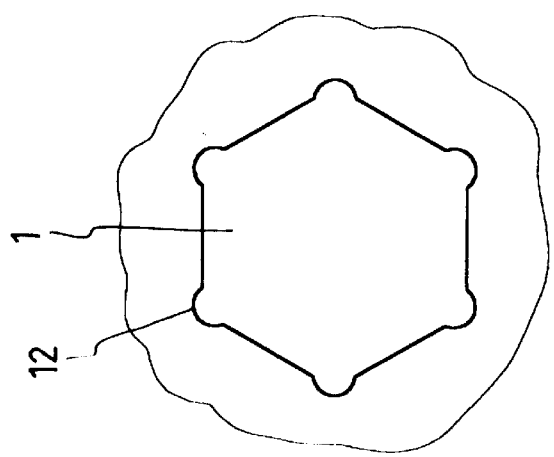
FIG. 4 is a schematic view of a third preferred embodiment of the present invention, showing a square driving recess formed on the screw head.
Figure 3:
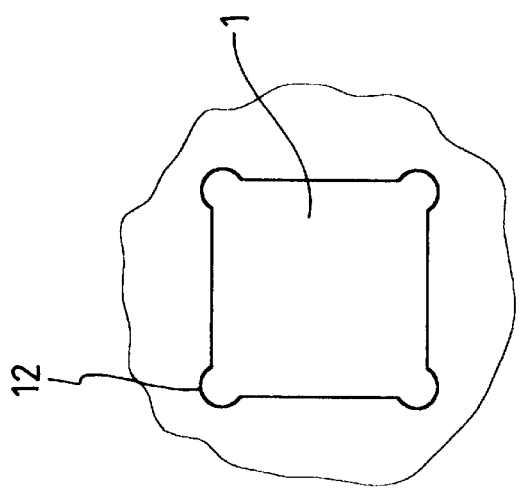
FIG. 3 is a schematic view of a second preferred embodiment of the present invention, showing a square driving recess formed on the screw head.
Figure 2:
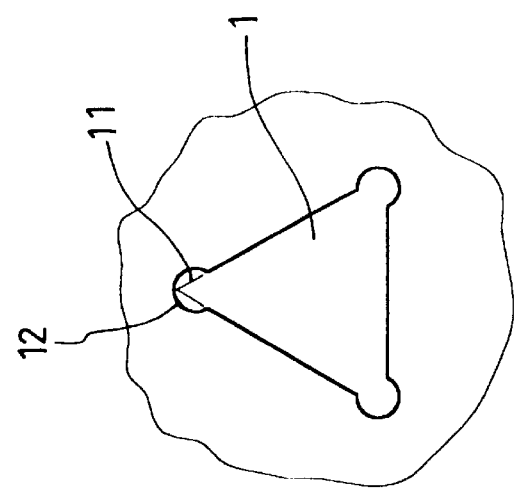
FIG. 2 is a schematic view of a first preferred embodiment of the present invention, showing a triangle driving recess formed on the screw head.

Basically, a screw according to the present invention is provided with a head which can have thereon a triangle (as shown in FIG. 2), a square (as shown in FIG. 3), a hexagonal (as shown in FIG. 4), or even any other multiangular driving recess 1. As discussed above, the driving recess 1 is forge-formed by a die.

The improvement of the present invention is that a stress-relieving notch 12 is formed at each corner 11 of the driving recess 1. These stress-relieving notches 12 vary with their respective driving recesses in shape, but they are preferably designed to be in an equal arcuate shape, so that no sharp edge exists at the corner 11.

Figure 5:
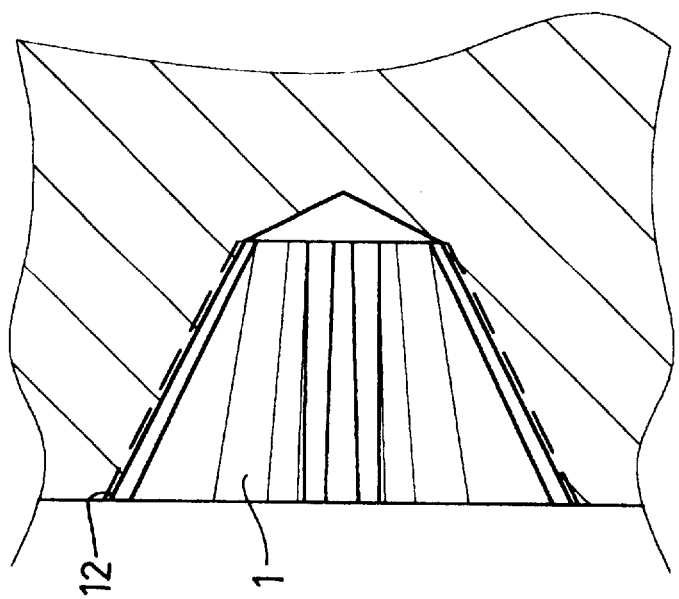
FIG. 5 is a schematic view of a fourth preferred embodiment of the present invention, showing a cross recess Type 1 formed on the screw head.
Figure 6:
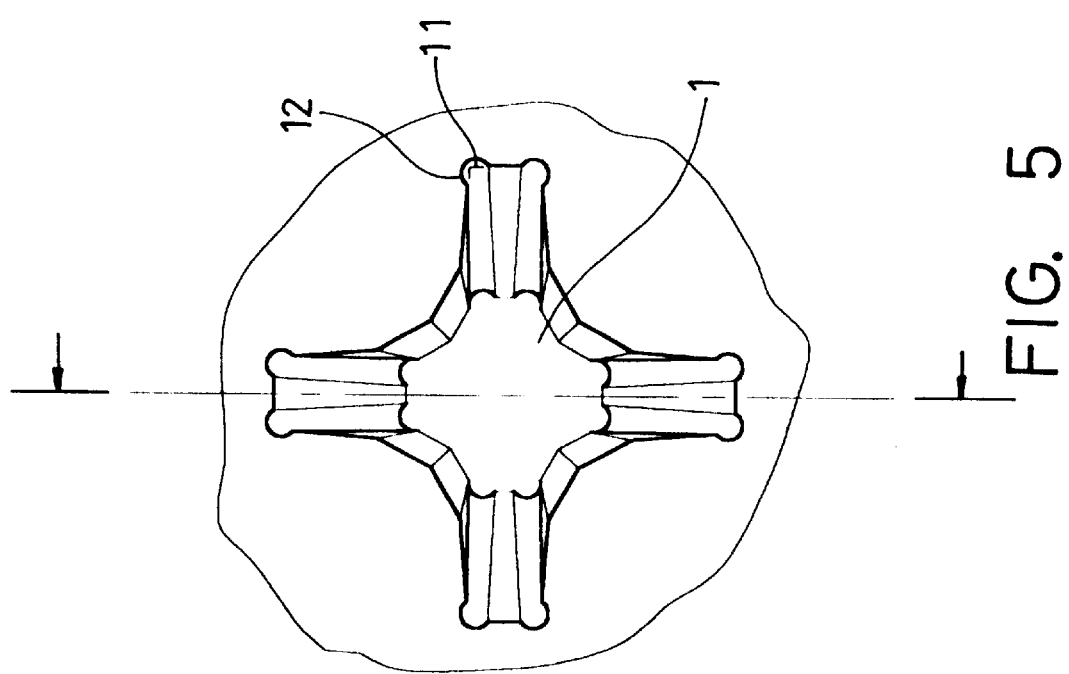
FIG. 6 is a sectional view of FIG. 5.

FIGS. 5 and 6 show a cross recess Type 1 head screw, in which a known cross driving recess 1 on the head has a stress-relieving notch 12 formed at each corner 11 thereof. Similarly, these stress-relieving notches 12 are preferably in an equal arcuate shape and are formed integrally with the driving recess 1. As shown in FIG. 6, each stress-relieving notch 12 is designed to have its depth terminated at the bottom of the driving recess 1.

Figure 7:
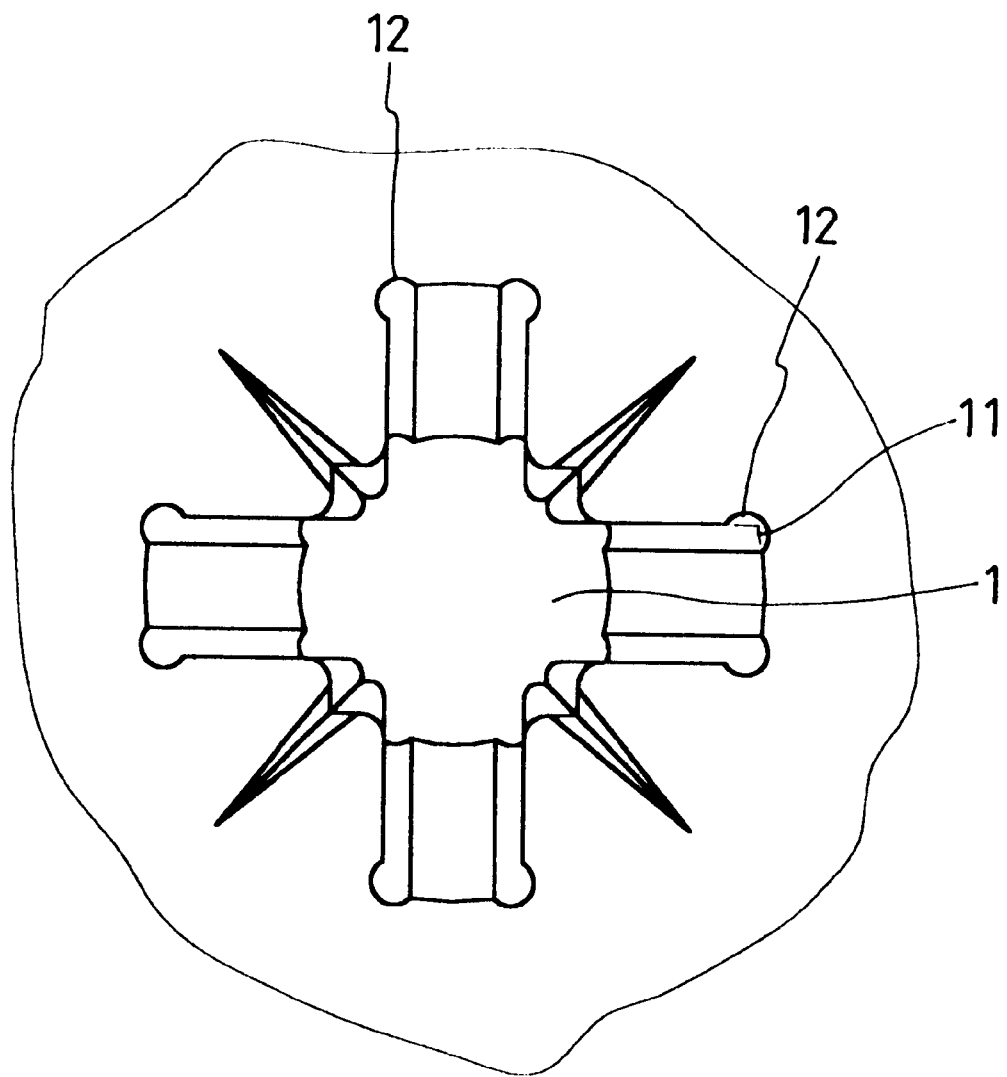
FIG. 7 is a schematic view of a fifth preferred embodiment of the present invention, showing a cross recess Type 1A formed on the screw head.

Referring to FIG. 7, it shows another embodiment of the driving recess 1 on a screw head according to the present invention. The driving recess configured as shown has a stress-relieving notch 12 provided at each corner 11 thereof. Also, these stress-relieving notches 12 are preferably designed to be in an equal arcuate shape.

As discussed above, the screw according to the present invention is subject to forge-forming process. Therefore, if the punch used for this purpose is provided at each corner thereof with an arcuate raised portion corresponding to the respective stress-relieving notch, then upon such forge-forming, the stress applied to each corner of the driving recess 1 will be distributed along the arcuate line of the stress-relieving notch, thereby preventing the occurrence of cracks A as discussed above. Consequently, both the production quality and rate of finished products are considerably improved.

The advantages resulted from the screw according to the present invention are as follows:

(1) The stress-relieving notch in an equal arcuate shape can effectively reduce the rupture possibility of a punch upon the processing operation, thus increasing the service life of such a punch and cutting down the manufacturing cost.

(2) The stress-relieving notch in an equal arcuate shape reduces the cracking caused to the driving recess on the screw head by a stress concentration. In this case, highly hardened materials, such as stainless steel, high carbon steel, or even aerospace Alloy, can be selected for production purpose.

(3) As there is no sharp edge at each corner of the driving recess, the contact area between a tool and the driving recess on the screw head will be increased to improve the effect of applied force, enhance the practicality of products, and reduce the damage caused by the tool to the screw, or vice versa.

(4) The stress-reliving notch according to the present invention is only an improvement in physical property, and will not change the specification of existing screw. Thus, all quality control instruments which have been already used, such as plug gauge, depth gauge, etc., or the operation and training of operators still can be applied. As a result, no additional cost is required.

Although the present invention has been illustrated and described with reference to the preferred embodiment thereof, it should be understood that it is in no way limited to the details of such embodiment but is capable of numerous modifications within the scope of the appended claims.

What is claimed is:

1. A screw having a screw head comprising:
   a) a driving recess in the screw head, the driving recess having a plurality of corners;
   b) an arcuate stress relieving notch formed at each corner of the driving recess, the stress relieving notches having equal arcuate configurations; and,
   c) a single flat, planar surface extending between each two adjacent arcuate stress relieving notches.

2. The screw as defined in claim 1, wherein said driving recess is triangular in cross-section.

3. The screw as defined in claim 1, wherein said driving recess is square in cross-section.

4. The screw as defined in claim 1, wherein said driving recess is hexagonal in cross-section.

* * * * *